(12) United States Patent
Norbeck

(10) Patent No.: US 7,918,099 B2
(45) Date of Patent: *Apr. 5, 2011

(54) MEDIUM VOLTAGE STARTER FOR A CHILLER UNIT

(75) Inventor: Dean K. Norbeck, Marco Island, FL (US)

(73) Assignee: York International Corporation, York, PA (US)

( * ) Notice: Subject to any disclaimer, the term of this patent is extended or adjusted under 35 U.S.C. 154(b) by 29 days.

This patent is subject to a terminal disclaimer.

(21) Appl. No.: 12/040,063

(22) Filed: Feb. 29, 2008

(65) Prior Publication Data

US 2008/0141692 A1 Jun. 19, 2008

Related U.S. Application Data

(63) Continuation of application No. 11/314,148, filed on Dec. 21, 2005, now Pat. No. 7,353,662.

(60) Provisional application No. 60/638,828, filed on Dec. 22, 2004.

(51) Int. Cl.
*F25B 1/00* (2006.01)
(52) U.S. Cl. ........................ 62/228.1; 62/259.1
(58) Field of Classification Search ............. 62/228.1, 62/298, 259.1, 478, 498; 310/94, 98; 415/17, 415/19
See application file for complete search history.

(56) References Cited

U.S. PATENT DOCUMENTS

| 2,290,984 | A | * | 7/1942 | McCoy, Jr. ............... 62/208 |
| 2,739,458 | A | | 3/1956 | Newton |
| 3,057,172 | A | | 10/1962 | Ditzler |
| 3,293,876 | A | * | 12/1966 | Geisler ............... 62/184 |
| 3,380,262 | A | * | 4/1968 | Miner ............... 62/209 |
| 3,739,596 | A | * | 6/1973 | Ballard ............... 62/158 |
| 3,818,983 | A | | 6/1974 | Grandia |
| 3,959,704 | A | | 5/1976 | McCrea |
| 4,084,406 | A | | 4/1978 | Brenneman |
| 4,398,400 | A | | 8/1983 | Bar |
| 4,438,383 | A | * | 3/1984 | Etheridge ............... 318/799 |
| 4,787,211 | A | * | 11/1988 | Shaw ............... 62/117 |
| 4,895,005 | A | | 1/1990 | Norbeck et al. |
| 4,965,658 | A | | 10/1990 | Norbeck et al. |
| 5,006,682 | A | * | 4/1991 | Sloff et al. ............... 200/429 |
| 5,058,389 | A | | 10/1991 | Yasuda et al. |
| 5,553,997 | A | | 9/1996 | Goshaw et al. |
| 5,563,489 | A | | 10/1996 | Murry |
| 5,655,380 | A | | 8/1997 | Calton |
| 5,838,144 | A | | 11/1998 | Wills et al. |
| 5,963,420 | A | * | 10/1999 | Bailey et al. ............... 361/616 |

(Continued)

FOREIGN PATENT DOCUMENTS

JP 200148552 A 2/2001

*Primary Examiner* — Mohammad M Ali

(74) *Attorney, Agent, or Firm* — McNees Wallace & Nurick LLC

(57) ABSTRACT

A single medium voltage starter box is mounted on a chiller unit with the other components of the chiller system. The starter box can be positioned on the chiller system unit to permit the starter box to be close coupled to the motor, and specifically to the main motor lead exit hub without the need for any power conduit connections between the starter box and the motor. In addition, the starter box also does not require any control interface and receives controls from a control panel. A short conduit connection between the control panel and the starter box is used to provide the necessary connections between the control panel and the starter box.

20 Claims, 8 Drawing Sheets

U.S. PATENT DOCUMENTS

| | | |
|---|---|---|
| 5,970,733 A | 10/1999 | Hamaoka et al. |
| 6,208,111 B1 | 3/2001 | Williams |
| 6,330,806 B1 | 12/2001 | Beaverson et al. |
| 6,375,439 B1 * | 4/2002 | Missio ................. 417/410.1 |
| 6,395,985 B1 | 5/2002 | Djeddah |
| 6,427,464 B1 | 8/2002 | Beaverson et al. |
| 6,558,905 B1 * | 5/2003 | van Dijk et al. ............ 435/6 |
| 6,564,560 B2 | 5/2003 | Butterworth et al. |
| 6,679,076 B1 | 1/2004 | Duga et al. |
| 6,691,531 B1 | 2/2004 | Martinez et al. |
| 6,783,080 B2 | 8/2004 | Antoniou et al. |
| 2003/0078742 A1 | 4/2003 | VanderZee et al. |
| 2004/0016245 A1 | 1/2004 | Pierson |
| 2004/0035127 A1 | 2/2004 | Adaniya et al. |
| 2004/0035851 A1 | 2/2004 | Antoniou et al. |
| 2004/0107711 A1 | 6/2004 | Sastry |
| 2004/0107718 A1 | 6/2004 | Bowman et al. |

* cited by examiner

MEDIUM VOLTAGE STARTER FOR A CHILLER UNIT

CROSS REFERENCE TO RELATED APPLICATIONS

This application claims the benefit of U.S. Provisional Application No. 60/638,828 filed Dec. 22, 2004.

BACKGROUND OF THE INVENTION

The present invention relates generally to a medium voltage starter for a chiller unit and, specifically, to a unit mounted, single box, medium voltage solid-state starter for a chiller unit.

In low voltage chiller systems, the starter box for the compressor motor can be mounted directly on the chiller system as discussed in U.S. Pat. No. 4,895,005, which patent is hereby incorporated by reference. However, for a medium voltage chiller system, the starter box for the compressor is typically mounted on the floor either next to the chiller system or in a separate equipment room because of the larger size of the starter box, typically greater than 60 cubic feet.

One of the reasons for mounting the starter box on the floor for medium voltage chiller systems is that medium voltage is typically ten times greater than low voltage. This larger voltage can create a more difficult working environment because the electrical strike distance and creep distance are much longer than in a low voltage environment. These longer distances require larger electrical spacings and protective equipment for the mounting of components resulting in a larger starter box. In addition, the devices used for the medium voltage starter box must be designed for the larger voltages, which also contributes to a larger starter box.

One attempt that has been made to mount medium voltage starter components on the chiller system is described in U.S. Pat. No. 6,679,076 to Duga et al. The Duga et al. system discusses the use of two starter boxes mounted on the chiller system for specific sizes of chiller systems and with specific unit mounting locations. The two starter boxes in the Duga et al. system are interconnected by wiring conduit. One major drawback of the two box arrangement in the Duga et al. system is that it involves complicated and expensive wiring arrangements in order to interconnect the boxes and the motor.

Therefore, what is needed is a single box, medium voltage solid-state starter for a chiller system that can be mounted on the chiller unit.

SUMMARY OF THE INVENTION

One embodiment of the present invention is directed to a chiller system having a compressor, a condenser and an evaporator connected in closed refrigerant loop. The compressor, condenser and evaporator are integrally mounted to form a chiller system unit. The chiller system also includes a medium voltage motor connected to the compressor to drive the compressor. The medium voltage motor is mounted on the chiller system unit. The chiller system has a control panel to control operation of the chiller system and a single starter box having all the starting components used in starting and operating the medium voltage motor. The control panel is mounted on the chiller system unit and the starter box is mounted on the chiller system unit adjacent to the medium voltage motor. The starter box is mounted on the chiller system to permit a close coupling of electrical connections between the starter box and the medium voltage motor without a power conduit connection between the starter box and the medium voltage motor.

Another embodiment of the present invention is directed to a chiller system having a compressor, a condenser and an evaporator connected in closed refrigerant loop. The compressor, condenser and evaporator are integrally mounted to form a chiller system unit. The chiller system also has a medium voltage motor connected to the compressor to drive the compressor and a control panel to control operation of the chiller system. The medium voltage motor and the control panel are mounted on the chiller system unit. The chiller system further has a single starter box used in starting and operating the medium voltage motor. The starter box is mounted on the chiller system unit adjacent to the medium voltage motor. The starter box includes a solid state starter device including at least one silicon controlled rectifier, a manually operated main disconnect switch, a first electrical switching arrangement connected between the manually operated main disconnect switch and the solid state starter device, and a bypass arrangement including a second electrical switching arrangement. The solid state starter device is electrically connected to the medium voltage motor. The manually operated main disconnect switch is electrically connected to a medium voltage power source. The first electrical switching arrangement is configured to be opened and closed in response to control instructions received from the control panel. The bypass arrangement is connected in parallel with the solid state starter device between the first electrical switching arrangement and the medium voltage motor to bypass the solid state starter device after the medium voltage motor is started. Finally, the starter box is mounted on the chiller system to permit a close coupling of electrical connections between the starter box and the medium voltage motor without a power conduit connection between the starter box and the medium voltage motor.

Still another embodiment of the present invention is directed to a chiller system having a compressor, a condenser and an evaporator connected in closed refrigerant loop. The compressor, condenser and evaporator are integrally mounted to form a chiller system unit. The chiller system also has a medium voltage motor connected to the compressor to drive the compressor. The medium voltage motor is mounted on the chiller system unit. Finally, the chiller system has a control arrangement that consists of a control panel to control operation of the chiller system and a single starter box controlled by the control panel and including all starting components used in starting and operating the medium voltage motor. The control panel is mounted on the chiller system unit and the starter box is mounted on the chiller system unit adjacent to the medium voltage motor. The starter box is mounted on the chiller system to permit a close coupling of electrical connections between the starter box and the medium voltage motor without a power conduit connection between the starter box and the medium voltage motor.

One advantage of the present invention is that it provides a compact, space saving, power control for chiller motors that can easily be incorporated on a chiller system unit.

Another advantage of the present invention is that it saves equipment room floor space.

Still another advantage of the present invention is that fewer materials, e.g., sheet metal, conduit connections, electrical connectors, conduit, etc., are required for the chiller system.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
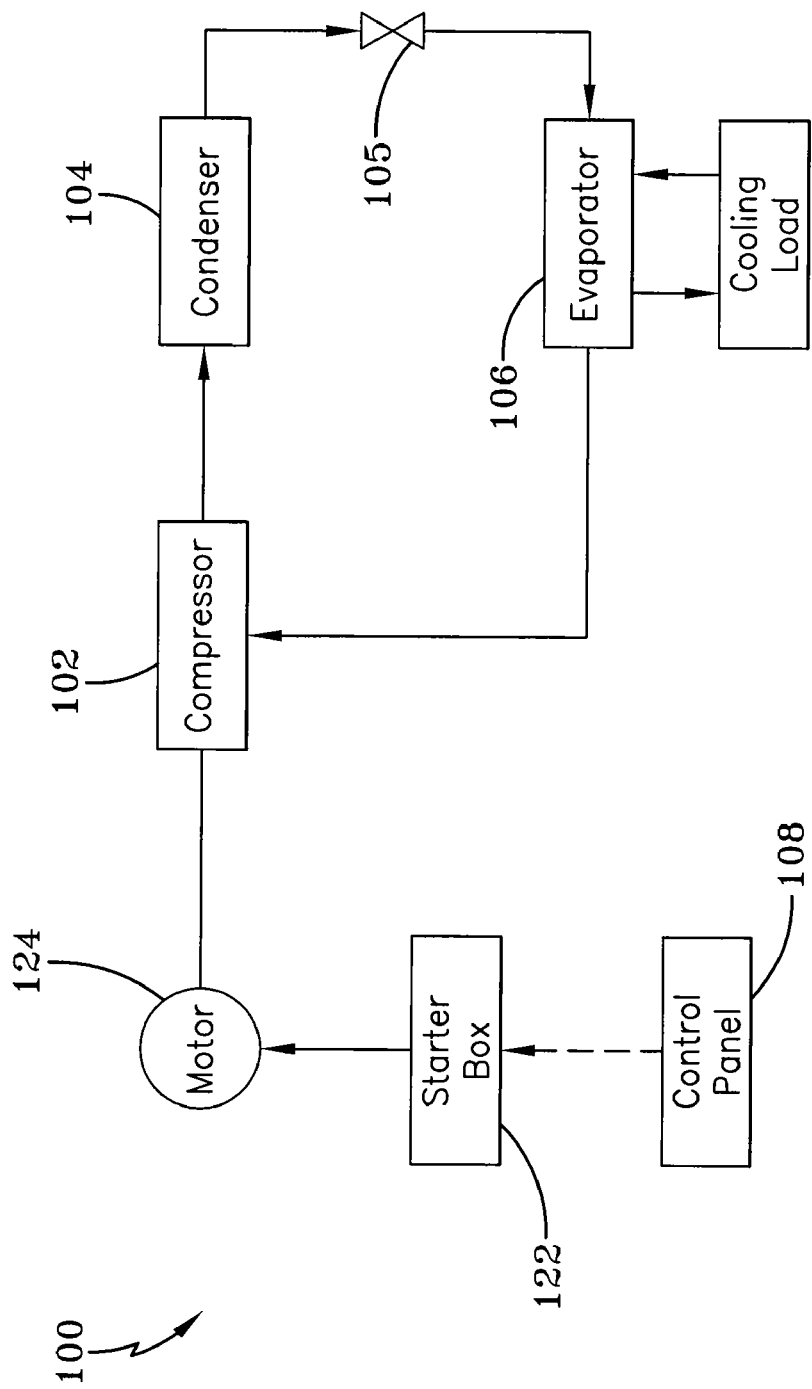
FIG. 1 illustrates schematically a chiller system of the present invention.

FIG. 1 illustrates generally the HVAC, refrigeration or liquid chiller system 100 of the present invention. As shown in FIG. 1, the HVAC, refrigeration or liquid chiller system 100 includes a compressor 102, a condenser arrangement 104, expansion device(s) 105, a liquid chiller or evaporator arrangement 106 and a control panel 108. A motor 124 can be used to drive the compressor 102, and a starter box 122 is close coupled to the motor 124 to start the motor 124. The motor 124 and starter box 122 are preferably configured for medium voltage operation, i.e., operation at greater than about 600 V and less than about 12 kV. The compressor 102, condenser arrangement 104, expansion device(s) 105, evaporator arrangement 106, control panel 108, motor 124 and the starter box 122 are all preferably mounted together as a structure or integrally mounted to form a chiller system unit. A conventional HVAC, refrigeration or liquid chiller system 100 includes many other features that are not shown in FIG. 1. These features have been purposely omitted to simplify the drawing for ease of illustration.

The motor 124 is preferably a fixed speed motor, but, in another embodiment of the present invention, can be a variable speed motor. In the embodiment of the present invention where the motor 124 is a variable speed motor, the starter box 122 can be replaced with a variable speed drive configured for operation at medium voltage in order to operate the motor 124 at variable speeds.

Compressor 102, driven by motor 124, compresses a refrigerant vapor and delivers the vapor to the condenser 104 through a discharge line. The compressor 102 is preferably a centrifugal compressor, but can be any suitable type of compressor, e.g., screw compressor, reciprocating compressor, etc. The refrigerant vapor delivered by the compressor 102 to the condenser 104 enters into a heat exchange relationship with a fluid, preferably water, and undergoes a phase change to a refrigerant liquid as a result of the heat exchange relationship with the fluid. The condensed liquid refrigerant from condenser 104 flows through an expansion device 105 to an evaporator 106.

The evaporator 106 can include connections for a supply line and a return line of a cooling load. A secondary liquid, e.g. water, ethylene glycol, calcium chloride brine or sodium chloride brine, travels into the evaporator 106 via return line and exits the evaporator 106 via supply line. The liquid refrigerant in the evaporator 106 enters into a heat exchange relationship with the secondary liquid to lower the temperature of the secondary liquid. The refrigerant liquid in the evaporator 106 undergoes a phase change to a refrigerant vapor as a result of the heat exchange relationship with the secondary liquid. The vapor refrigerant in the evaporator 106 exits the evaporator 106 and returns to the compressor 102 by a suction line to complete the cycle. It is to be understood that any suitable configuration of condenser 104 and evaporator 106 can be used in the system 100, provided that the appropriate phase change of the refrigerant in the condenser 104 and evaporator 106 is obtained.

The control panel 108 can include an analog to digital (A/D) converter, a microprocessor, a non-volatile memory, and an interface board to control operation of the refrigeration system 100. Preferably, the control panel 108 can execute a control algorithm(s) to control operation of the starter box 122 or the power sections of a variable speed drive. This control of the starter box 122 or variable speed drive by the control panel 108 can provide an operator of the system 100 with a single interface point for controlling the system 100. In one embodiment, the control algorithm(s) can be computer programs or software stored in the non-volatile memory of the control panel 108 and can include a series of instructions executable by the microprocessor of the control panel 108. While it is preferred that the control algorithm be embodied in a computer program(s) and executed by the microprocessor, it is to be understood that the control algorithm may be implemented and executed using digital and/or analog hardware by those skilled in the art. If hardware is used to execute the control algorithm, the corresponding configuration of the control panel 108 can be changed to incorporate the necessary components and to remove any components that may no longer be required.

As discussed above, the control panel 108 can execute a control algorithm(s) to control operation of the starter box 122 or the power sections of a variable speed drive. In one embodiment, the control panel 108 can provide all of the controls for the components in the starter box 122 and thus, the starter box 122 does not require any control interface or corresponding control components. However, in another embodiment of the present invention, the control panel 108 can provide just control commands or control signals, e.g., start commands, stop commands, etc., to the starter box 122 and receive data from the components of the starter box 122 regarding the operation of the starter box 122, i.e., a data acquisition function. In this embodiment, the starter box 122 again does not have any operator control interface, but may have corresponding control components to process the control commands from the control panel 108.

The starter box 122 or variable speed drive is preferably mounted on the chiller system unit with the other components of the chiller system 100. To permit the starter box 122 to be mounted on the chiller system 100, the starter box 122 preferably has a size of between about 42 cubic feet and about 50 cubic feet. In one preferred embodiment, the starter box 122 has a size of about 46 cubic feet. In one embodiment of the present invention, the starter box 122 can have a width of about 59 inches, a height of about 52 inches and a depth of about 26.375 inches. In another similar embodiment, the starter box 122 can have a width of about 59 inches, a height of about 51 inches and a depth of about 26.375 inches.

FIGS. 3-7 illustrate preferred mountings of the control panel 108 and/or the starter box 122 on the chiller system unit. The control panel 108 and the starter box 122 are preferably mounted on one of the system shells, i.e., the condenser shell 104 or the evaporator shell 106, of the chiller system unit. A short conduit connection 302 between the control panel 108 and the starter box 122 is used to provide the necessary connections between the control panel and the starter box 122. In addition, the starter box 122 is placed on the chiller system unit to permit the starter box 122 to be directly or close coupled to the motor 124 and specifically to the main motor lead exit hub (not shown), without the need for any power conduit connections between the motor box 122 and the motor 124. The only power conduit connection that is needed is the connection 304 between the building electrical service, i.e., the medium voltage power supply or source, and the starter box 122. In another embodiment of the present invention, the starter box 122 can still be mounted on the chiller system unit but not in a position to provide the close coupling to the motor 124. In this embodiment, a power conduit can be used to connect the motor 124 and the starter box 122.

Figure 4:
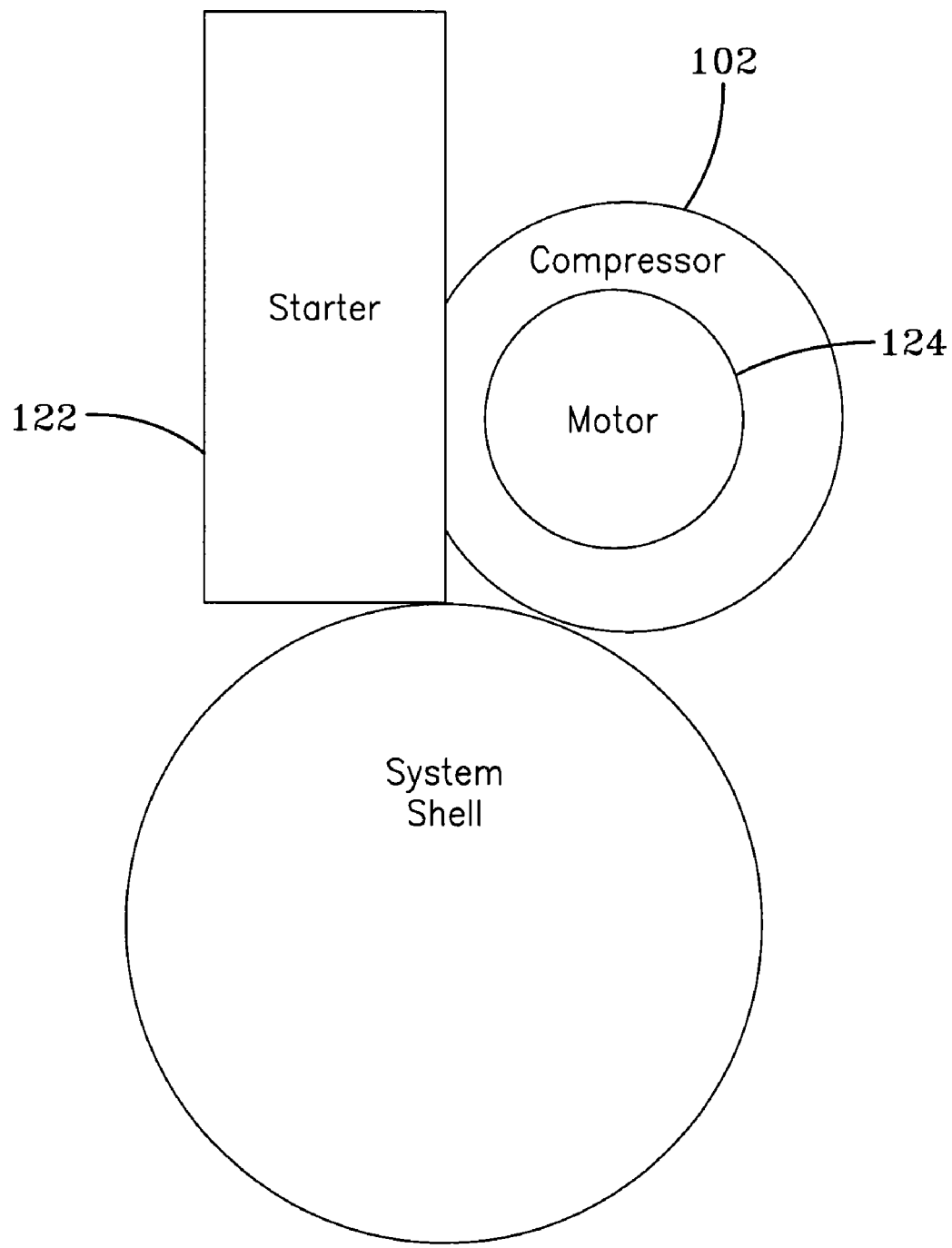
FIG. 4 illustrates schematically a partial end view of an embodiment of the starter box being mounted on a chiller system.
Figure 5:
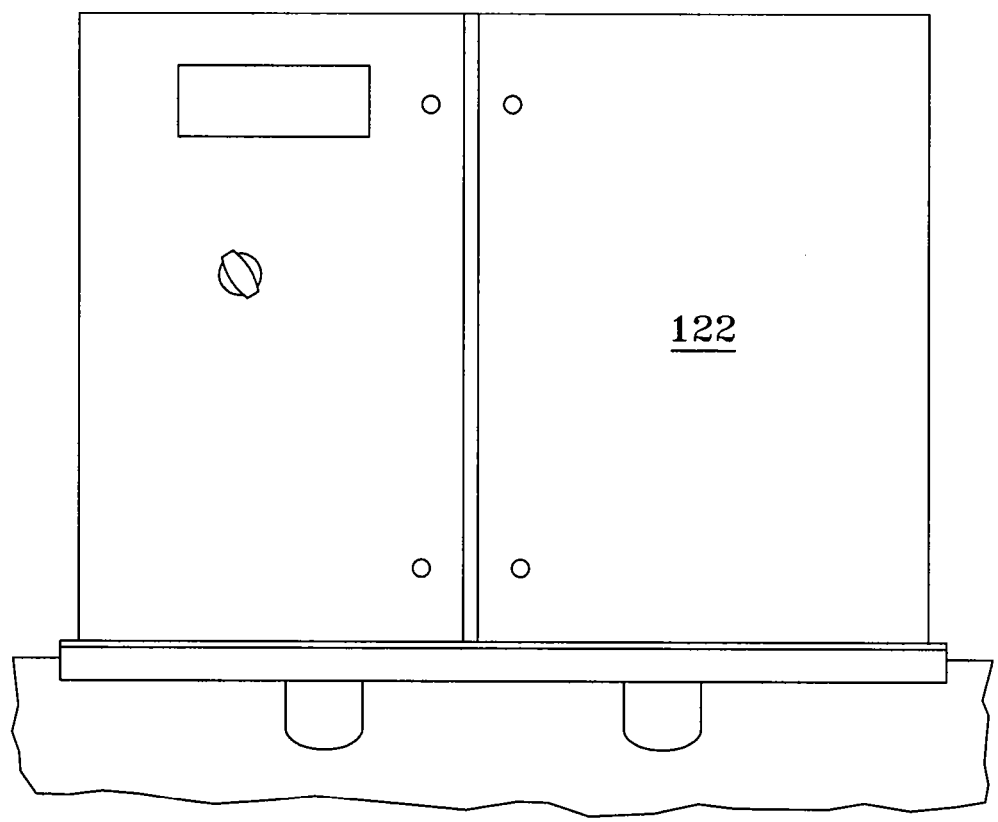
FIG. 5 illustrates a front view of an embodiment of the starter box being mounted on a chiller system.
Figure 6:
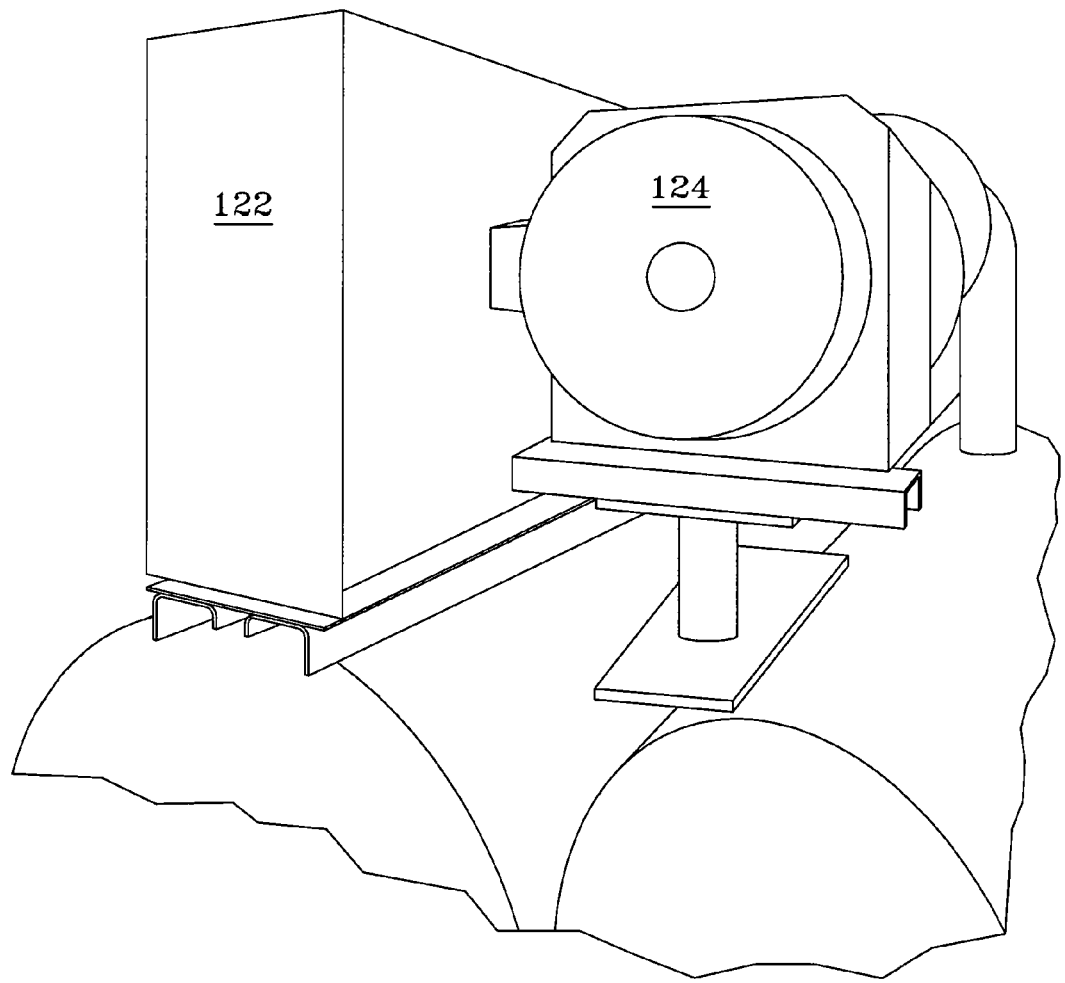
FIG. 6 illustrates an oblique view of an embodiment of the starter box being mounted on a chiller system.
Figure 7:
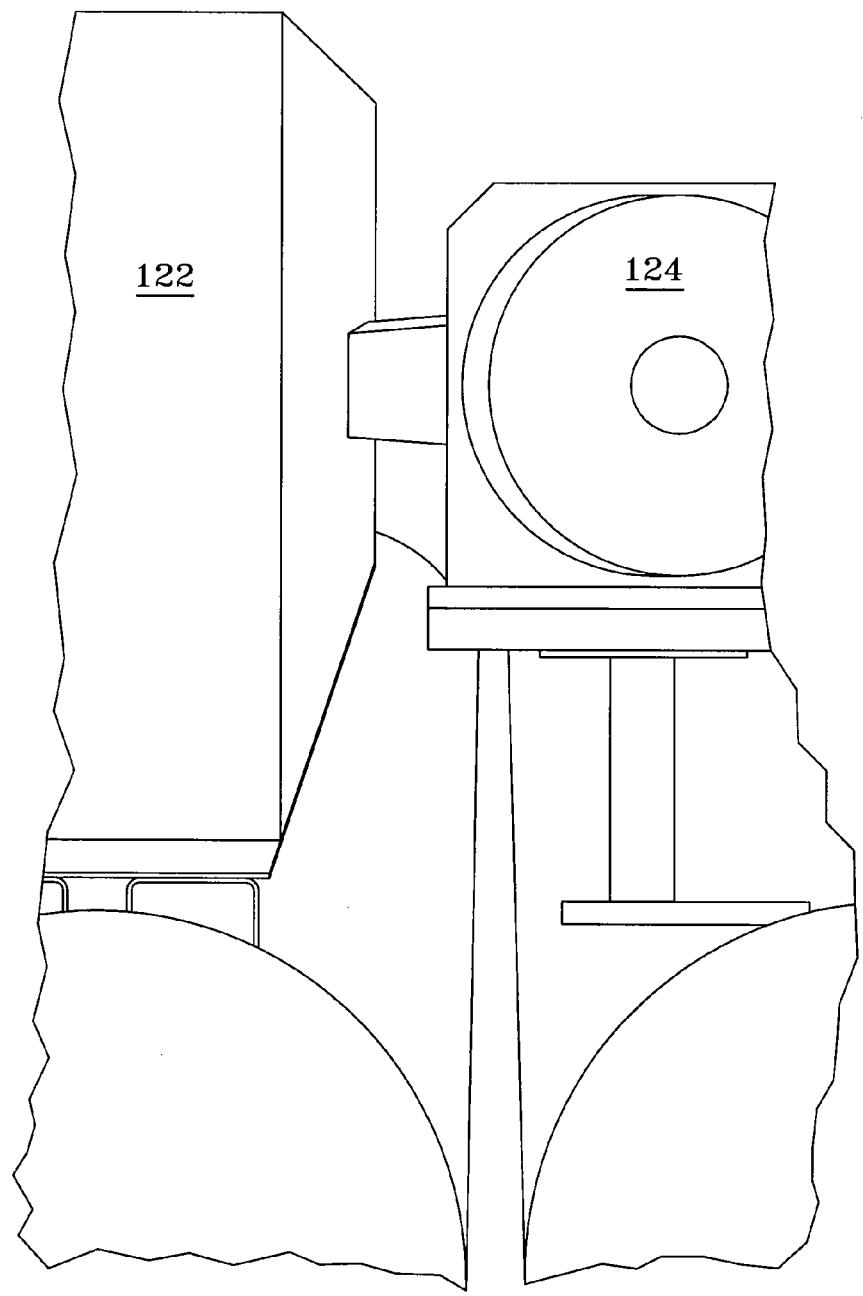
FIG. 7 illustrates a side view of an embodiment of the starter box being mounted on a chiller system.

In addition, as shown in FIG. 4, the motor 124 and compressor 102 can be mounted on the same system shell as the starter box 122 and control panel 108. However, in another embodiment, the motor 124 and compressor 102 can be mounted between the system shells using one or both of the system shells for support. In still a further embodiment, as shown in FIGS. 6 and 7, the motor 124 and compressor 102 can be mounted on the other system shell from the starter box 122 and control panel 108.

Figure 2A:
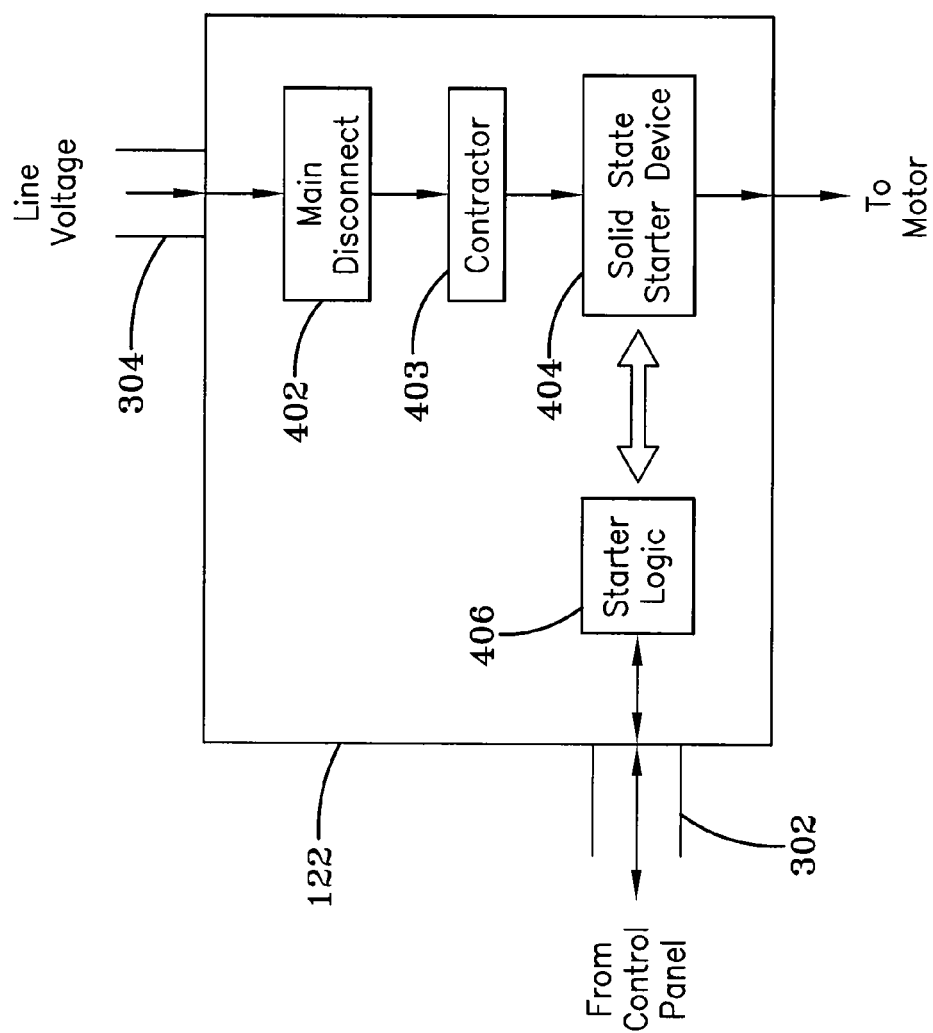
FIG. 2A illustrates one arrangement of a starter box of the present invention.
Figure 2B:
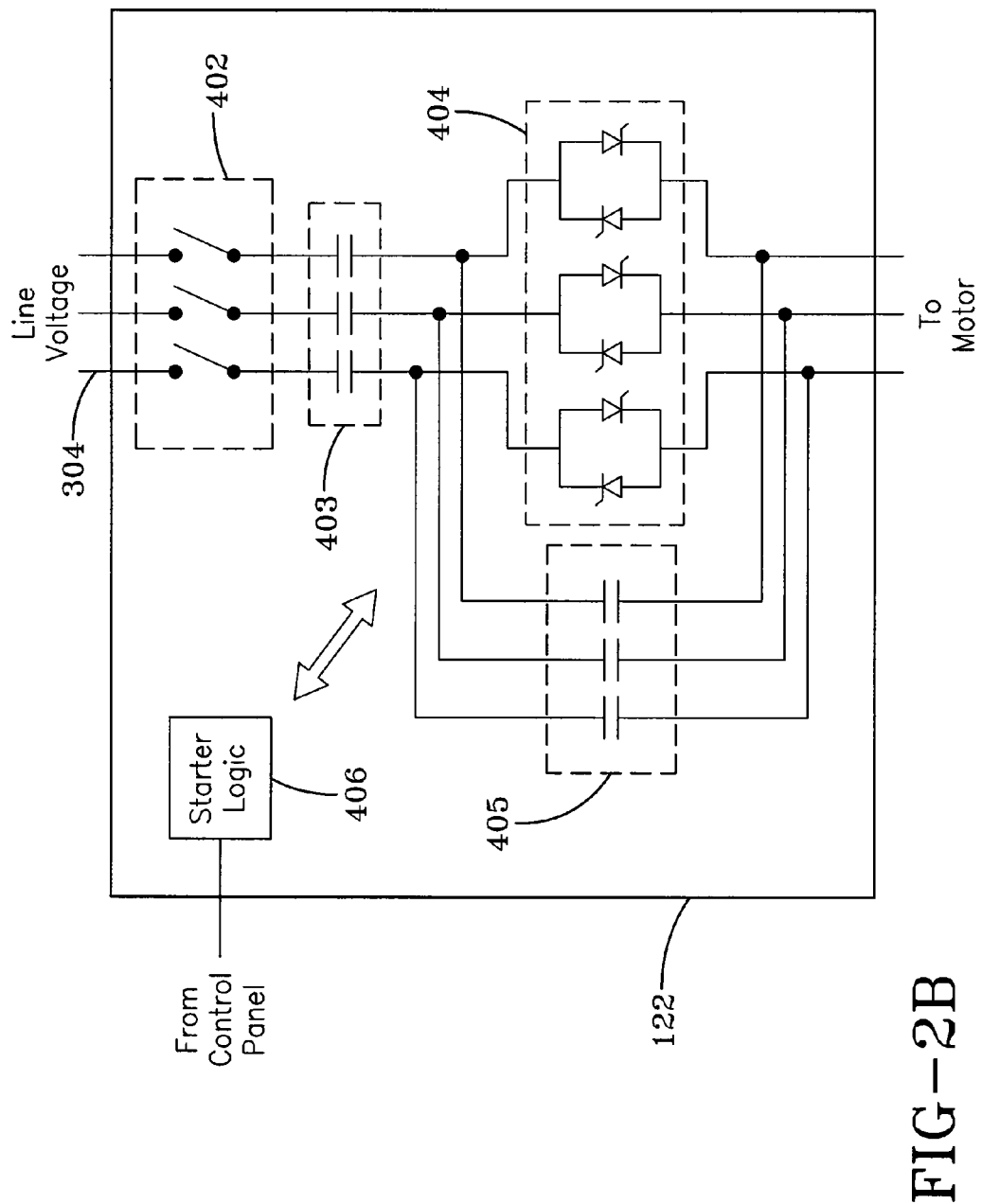
FIG. 2B illustrates another arrangement of the starter box of the present invention.
Figure 3:
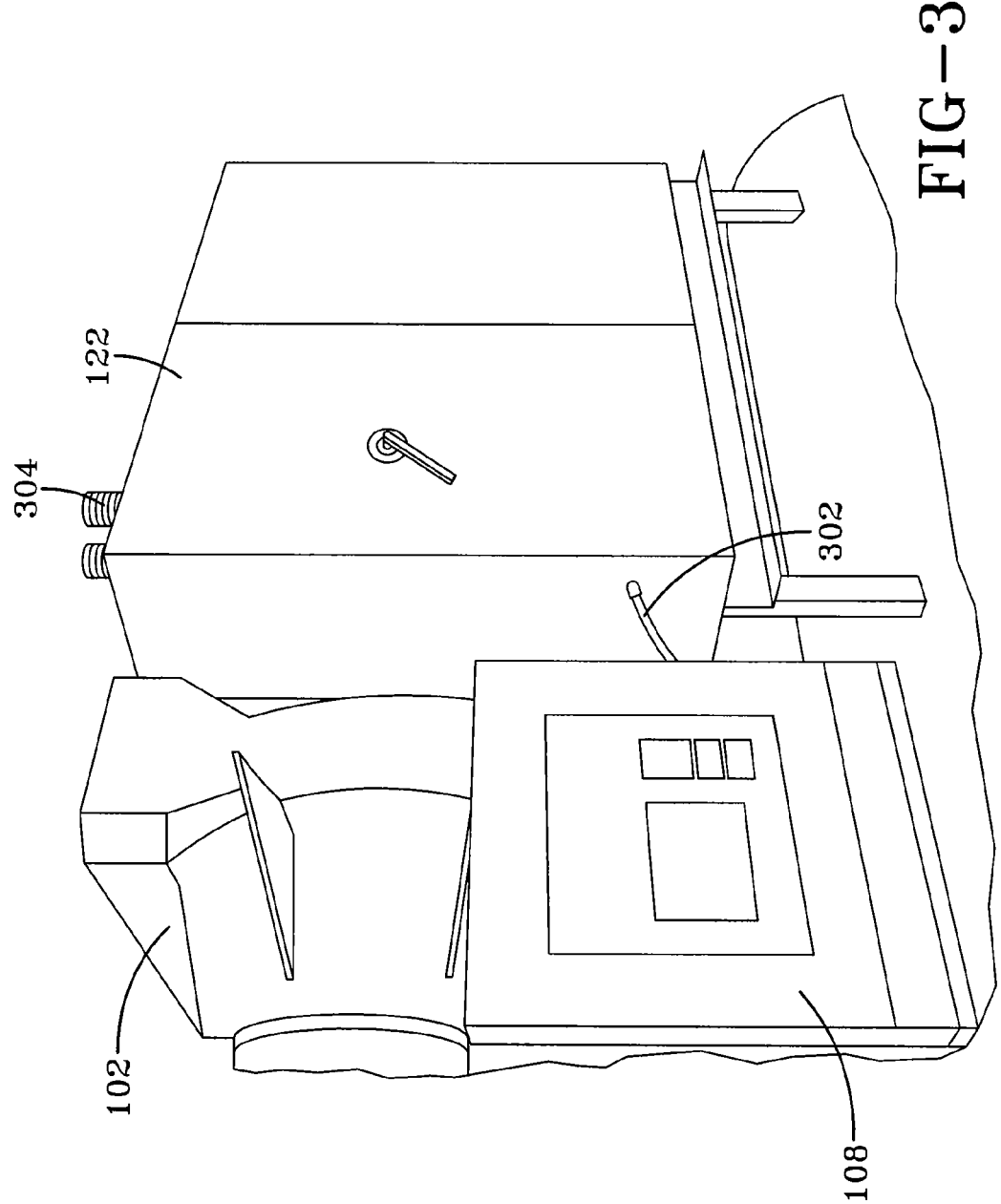
FIG. 3 illustrates a perspective view of an embodiment of the starter box and control panel being mounted on a chiller system.

FIGS. 2A and 2B illustrate configurations of some of the components of the starter box 122. In FIG. 2A, the power connection 304 from the building electrical service is connected to the starter box 122 and provides the medium voltage power or line voltage to a main disconnect switch 402. The main disconnect switch 402 can be used to disconnect the remaining components of the starter box 122 from the line voltage for safety reasons or any other suitable reason. The main disconnect switch 402 is manually operated and is preferably accessed from the outside of the starter box 122, thereby providing a mechanical safety interlock feature for the starter box 122. The main disconnect switch 402 is then connected to an electrical switching arrangement 403 that can also be used to disconnect power from the motor 124. The electrical switching arrangement 403 can be controlled directly by the control panel 108 or controlled indirectly by the control panel 108 through a starter logic module 406 in the starter box 122. The electrical switching arrangement 403 is a preferably a contactor arrangement having vacuum switches controlled by a coil. However, it is to be understood that any suitable electrical switching arrangement can be used for electrical switching arrangement 403.

The electrical switching arrangement 403 is connected to a solid-state starter device 404, which in turn is connected to the motor 124. The solid-state starter device 404 is preferably used to "soft start" the motor 124 on an initial startup of the motor and then to permit operation of the motor 124 at a fixed speed after startup. The solid-state starter device 404 can preferably incorporate semiconductor switches such as silicon controlled rectifiers (SCRs), insulated gate bipolar transistors (IGBTs), diodes or gate turn off (GTO) devices. The solid-state starter device 404 can preferably be controlled directly by the control panel 108 or controlled indirectly by the control panel 108 through the starter logic 406. In a preferred embodiment, all components in the starter box 122 requiring control connections are electrically connected or wired to the starter logic 406 (not specifically shown in FIG. 2A), which starter logic 406 then operates to facilitate communication between the components and the control panel 108.

FIG. 2B illustrates another configuration of the starter box 122. The configuration shown in FIG. 2B is similar to the configuration shown in FIG. 2A except that a bypass arrangement is included. The power connection 304 from the building electrical service is connected to the starter box 122 and provides the medium voltage power or line voltage to a main disconnect switch 402. The main disconnect switch 402 is then connected to an electrical switching arrangement 403 that can also be used to disconnect power from the motor 124. The electrical switching arrangement 403 is connected to a solid-state starter device 404, which, in turn, is connected to the motor 124. Starter logic 406 operates to facilitate communication between the components and the control panel 108. In a preferred embodiment, all components in the starter box 122 requiring control connections are electrically connected or wired to the starter logic 406 (not specifically shown in FIG. 2B), which starter logic 406 then operates to facilitate communication between the components and the control panel 108.

The bypass arrangement is used to electrically bypass the solid-state starter device 404 after the motor 124 has been started to permit the motor 124 to be powered by the line voltage from the main disconnect 402. The bypass arrangement includes a second electrical switching arrangement 405 that can be used to provide line power to the motor 124 without having to use the solid state starter device 404. By avoiding the use of the solid state starter device 404 for normal operations and limiting its use to start-up operations, the amount heat generated (and the amount of cooling that is required) in the starter box 122 is greatly reduced when compared to operating the solid starter device 404 for both start-up and normal operations. The electrical switching arrangement 405 can be controlled directly by the control panel 108 or controlled indirectly by the control panel 108 through the starter logic module 406. The electrical switching arrangement 405 is a preferably a contactor arrangement having vacuum switches controlled by a coil. However, it is to be understood that any suitable electrical switching arrangement can be used for electrical switching arrangement 405.

The starter box 122 includes many other features, such as a lightning arrestor and the appropriate fuses and buses, that are not shown in FIGS. 2A and 2B. These features have been purposely omitted to simplify the drawings for ease of illustration. The components of the starter box 122 are preferably air cooled, especially the embodiment in FIG. 2B, but can also be liquid cooled. If the starter box 122 is liquid cooled, the cooling liquid can include cooling fluids from the chiller system 100 such as water, oil or refrigerant to cool the components or electronics in the starter box 122. In still another embodiment of the present invention, the starter box 122 can also include the appropriate components, e.g., transformers, to power all motors on the chiller system unit including oil pump motors, cooling fluid pump motors, purge unit motors, fan motors etc.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system comprising:
   a compressor, a condenser and an evaporator, the compressor, condenser and evaporator being mounted as a structure;
   a motor connected to the compressor to drive the compressor, the motor being mounted on the structure, the motor being powered by a voltage greater than 600 volts and less than 12,000 volts;
   a single enclosure comprising all components used in starting and operating the motor, the enclosure and components being configured for operation at voltages in a range between 600 volts and 12,000 volts, the enclosure being mounted on the structure near the motor; and
   wherein the enclosure is mounted on the structure to permit electrical connections between the enclosure and the motor without a conduit connection between the enclosure and the motor.

2. The system of claim 1 wherein the components in the enclosure are one of air cooled or liquid cooled.

3. The system of claim 1 wherein the components of the enclosure comprise a solid state starter device, a main disconnect switch and a starter logic module.

4. The system of claim 3 wherein the solid state starter device comprises at least one silicon controlled rectifier.

5. The system of claim 3 wherein the solid state starter device is configured to provide a soft start to the motor.

6. The system of claim 3 wherein the starter logic module receives control instructions from the control panel for the components.

7. The system of claim 3 wherein the main disconnect switch comprises a manually operated switch.

8. The system of claim 7 wherein the components comprise an electrical switch connected between the main disconnect switch and the solid state starter device.

9. The system of claim 8 wherein the components a bypass connection, the bypass connection being connected in parallel with the solid state starter device between the electrical switch and the motor to bypass the solid state starter device after the motor is started.

10. The system of claim 9 wherein the bypass connection comprises a second electrical switch.

11. The system of claim 1 further comprising a control panel, the control panel being configured to control operation of the components in the enclosure.

12. The system of claim 1 further comprising a control panel, the control panel being configured to provide control commands to the components in the enclosure.

13. The system of claim 1 wherein the enclosure and the motor are mounted on one component of the structure.

14. A system comprising:
   a compressor, a condenser and an evaporator, the compressor, condenser and evaporator being mounted to form an integral unit;
   a motor connected to the compressor to drive the compressor, the motor being mounted on the unit, the motor being powered by a voltage greater than 600 volts and less than 12,000 volts;
   a control panel being mounted on the unit;
   a single box used in starting and operating the motor, the box being mounted on the unit near the motor, the box comprising:
      a starter comprising at least one silicon controlled rectifier, the starter being electrically connected to the motor, the starter being configured for operation at voltages in a range between 600 volts and 12,000 volts;
      a disconnect switch being electrically connected to a power source supplying a voltage greater than 600 volts and less than 12,000 volts;
      a first electrical switch connected between the disconnect switch and the starter, the first electrical switch being configured to be opened and closed in response to control instructions received from the control panel, the first electrical switch being configured for operation at voltages in a range between 600 volts and 12,000 volts; and
      a second electrical switch being connected in parallel with the starter between the first electrical switch and the motor to bypass the starter after the motor is started, the second electrical switch being configured for operation at voltages in a range between 600 volts and 12,000 volts; and
   wherein the box is mounted on the unit to permit electrical connections between the box and the motor without a power conduit connection between the box and the motor.

15. The system of claim 14 wherein the box is air cooled.

16. The system of claim 14 wherein the box further comprises a module, the module being configured to receive control instructions from the control panel and provide control instructions to the first electrical switch, the second electrical switch and the at least one silicon controlled rectifier.

17. The system of claim 14 wherein the box has a volume between about 42 cubic feet and about 50 cubic feet.

18. The system of claim 14 wherein the box and the motor are mounted on one component of the unit.

19. A system comprising:
   a compressor, a condenser and an evaporator, the compressor, condenser and evaporator being integrally mounted as a unit;
   a motor connected to the compressor to drive the compressor, the motor being mounted on the unit;
   a control panel being mounted on the unit; and
   a variable speed drive controlled by the control panel, the variable speed drive being configured to provide voltages to the motor in a range between 600 volts and 12,000 volts to operate the motor at variable speeds, the variable speed drive being mounted on the unit near the motor; and
   wherein the variable speed drive is mounted on the unit to permit electrical connections between the variable speed drive and the motor without a conduit connection between the variable speed drive and the motor.

20. The system of claim 19 wherein the control panel is configured to control power sections of the variable speed drive.

* * * * *